Aug. 14, 1956  F. D. DE VANEY ET AL  2,758,919
PROCESS OF PELLETIZING
Filed March 31, 1952
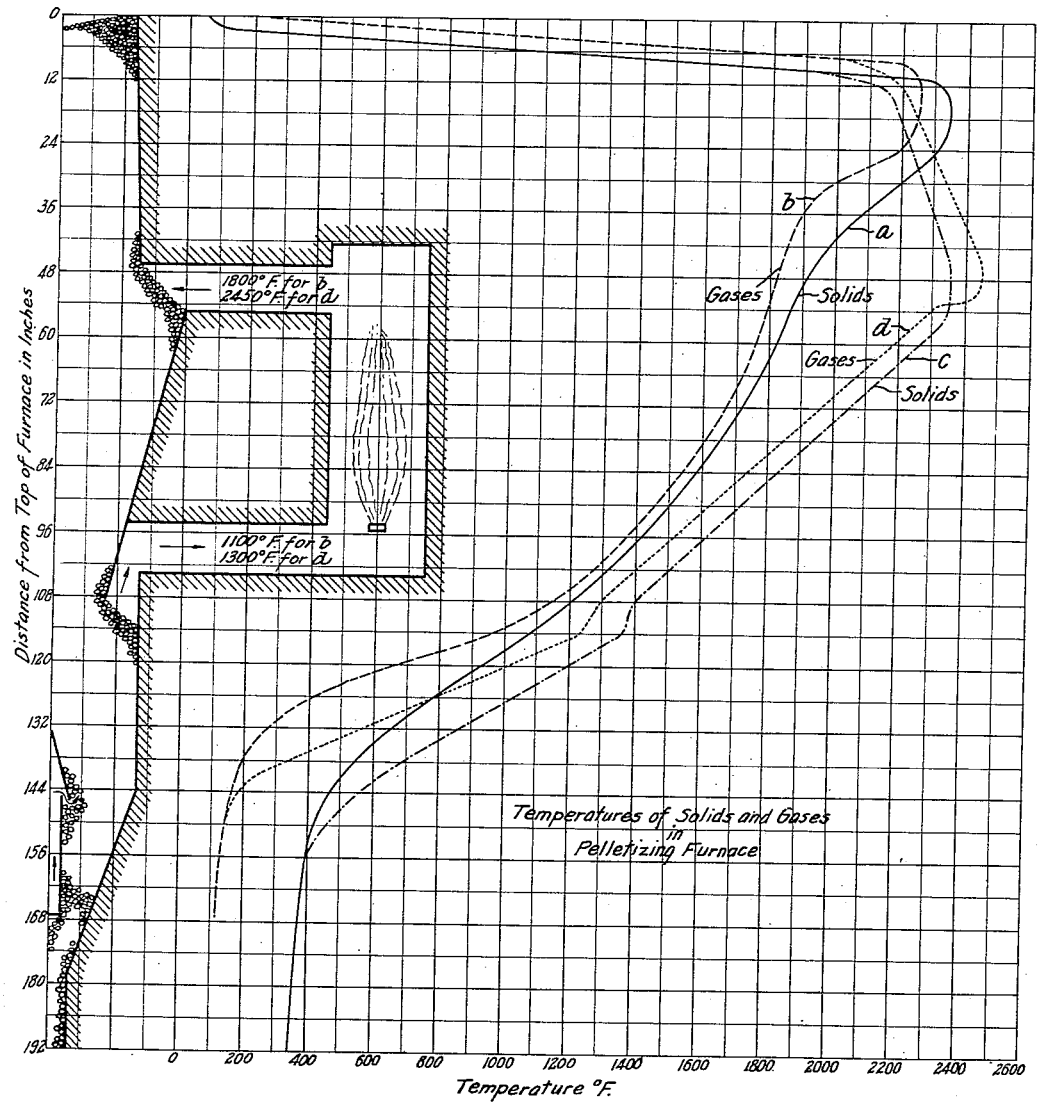
INVENTORS
Fred D. DeVaney and
Donald Beggs,
BY Pierce, Scheffler & Parker
their ATTORNEYS.

2,758,919

PROCESS OF PELLETIZING

Fred D. DeVaney, Hibbing, Minn., and Donald Beggs, Toledo, Ohio, assignors to Erie Mining Company, Hibbing, Minn., a corporation of Minnesota Application March 31, 1952, Serial No. 279,708

4 Claims. (Cl. 75—5)

This invention relates to improvements in the agglomeration of finely divided mineral solids, such as ore fines or phosphate rock or the like but particularly iron ore fines, by the so-called "pelletizing" process according to which the finely divided mineral solids in moist state are balled-up into small balls or pellets, ranging in size from about five-eighths inch to about one and one-half inches in diameter, by a rolling operation or by an extrusion process, and the pellets thereupon are subjected to heat-treatment (induration) in a shaft-type induration furnace. The conventional pelletizing process is generally disclosed in an article by C. V. Firth published in the April 20, 1944, issue of "Proceedings of the Blast Furnace and Raw Materials Committee," American Institute of Mining and Metallurgical Engineers.

According to the known pelletizing process the raw (i. e., the freshly formed, moist and essentially unheated) pellets are deposited, substantially continuously, onto the stockline of a column of similar pellets gravitationally descending through the shaft-type furnace while indurated pellets are discharged from the bottom of the column at a rate to maintain the column's height substantially constant; simultaneously a heating gas, conventionally a mixture of air and gaseous combustion products, is forced countercurrently (i. e., upwardly) through at least the upper part of the column, which heat-carrying gas in its intimate contact with the pellets of the column transfers to the pellets the heat required for driving off the moisture content of the pellets and for heating the pellets to a desired induration temperature. The extent to which pellets are indurated depends to a large extent on the temperature to which they are heated it being a generality that the higher the temperature of heating the harder and more rugged are the pellets. In the conventional process the measure of the extent of induration of the pellets is the temperature of this heating gas at the time the same enters the column of pellets, the "thermal history" of said gas as the same traverses the column being a descending line from the point of its introduction into the column down to the point of its departure from the column (at the stockline) as water vapor-laden spent gas.

The maximum induration temperature attainable under the conventional process is determined by the softening temperature of the pellets, it being apparent that if the heating gas be introduced into the column at a temperature equal to or higher than the softening temperature of the pellets the so-contacted pellets would soften and stick together into an "aggregate" as large as the cross-section of the indurating furnace—i. e., would make the operation impossible. Accordingly, the process has had to be so operated that the surfaces of the pellets never attained softening temperature.

It heretofore had been proposed to improve the above-described conventional process by appending a heat-recuperating chamber at the bottom of the indurating furnace proper, in which heat-recuperating chamber the indurated and still hot pellets would be caused to give up a large part of their heat to a countercurrent stream of cooling air, i. e., air at ambient temperature, thereby pre-heating said air stream, and by using the preheated air as the combustion-supporting gas for producing the above-mentioned heating gas. While this improvement works a very desirable economy in the conventional process it does not affect—one way or the other—the properties of the final product, nor does it alter the situation that the "thermal history" of the heating gas in its traverse of the pellets column in the indurating furnace is a descending line from the point of introduction of the heating gas into the column down to the exit point of the gas from the column.

It has been found that the conventional process above described is not capable of effecting the thoroughgoing induration desired or necessary. Particularly in those cases where the indurated product has to receive considerable rough handling incident to transporting the same to the point of use, i. e., to the blast furnace, it has been found that the indurated pellets tend to break into fragments and dust. Inspection of the indurated pellets, produced by the conventional procedure, shows that while their exterior shells may be fairly hard their interior cores are relatively soft and friable. Because in most instances the point of use is far removed from the source of the pelletized material, and because the pellets must in most instances be handled many times before they reach the blast furnace, it was obvious that some means must be provided for enhancing the mechanical strength or ruggedness of the pellets beyond that attainable by the conventional process.

For this purpose it had been suggested to add to the ore fines (or equivalent finely divided mineral solids), prior to the balling-up step, an "additive" which would augment the "natural" strength of the indurated pellets. Among others, Portland cement and water glass had been investigated as possible "additives." However, use of "additives" measurably increases the over-all cost of the pelletizing process, and, moreover, usually adulterates the pellets with components not desired in burdening the blast furnace.

An object of the present invention is the provision of an improved pelletizing process by which to augment the mechanical strength or ruggedness of the indurated pellets beyond that attainable by the conventional procedure. Another object of the invention is to provide a pelletizing process by which to produce indurated pellets whose interior cores are as mechanically strong as, or stronger than, their exterior shells. A further object is to provide a novel indurated pellets product. Another object is to provide indurated pellets of improved mechanical strength without increasing the cost of the pelletizing operation.

According to the present invention an exothermically oxidizable component is included in and homogeneously dispersed through the moist material prior to balling-up the latter, the relative amount of this component being insufficient per se to yield the heat necessary to raise the pellets to fusion temperature, and the temperature of the oxidizing gas introduced into the column at a level adjacent the bottom of the indurating chamber of the furnace is so regulated that the heat contained in the gas when supplemented by the heat of oxidation of the exothermically oxidizable component of the pellets is sufficient to cause the interiors of the pellets to attain fusion temperature while preventing any substantial fusion of their exteriors because of the below-fusion temperature of the gas sweeping over the surfaces of the pellets. Thereby the identity and discreteness of the pellets is maintained—because their exterior "shells" are not permitted to reach softening temperature—while at the same time the interiors of the pellets become heated to a temperature at which some, but not all, of the components of the pellets undergo at least partial fusion, thereby forming a fused bond or matrix for the unfused particles.

In so carrying out the pelletizing process it has been found that the "thermal history" of the oxidizing gas in traversing that part of the pellets column occupying the indurating chamber of the furnace is representable by a re-entrant curve (or ascending-descending line), and that the "thermal history" of the surface of the pellets passing through the indurating chamber is representable by a somewhat similar re-entrant curve which crosses that representing the thermal history of the oxidizing gas at about the peak points of the two curves. That is to say, the surfaces of the pellets, which at the moment of being charged onto the stockline are at about room temperature, very rapidly are heated, by heat transferred thereto from the adjacent gas, to a peak temperature occurring within a zone 10 to 24 inches below the stockline whereafter the temperature of the surfaces of the pellets gradually is decreased throughout the subsequent residence of the pellets in the furnace. The oxidizing gas, on the other hand, enters the column at a temperature substantially lower than that of the pellets at the level of gas introduction, and the gas temperature gradually increases—being, however, always lower than that of the contacted pellets—until the gas reaches the level in the column at which the aforesaid pellets' peak temperature occurs, at which point the temperature curves cross, that of the gas being higher than but roughly paralleling that of the pellets from said peak point level to the stockline level. Thus, the oxidizing gas—notwithstanding the fact that it is introduced at the bottom of the indurating chamber at an elevated temperature—positively functions as a cooling gas with respect to the contacted pellets until after the gas has risen beyond the level of peak temperature of the pellets, after which the gas is hotter than the pellets, giving up heat to the latter, and departs the column at a temperature substantially above 212° F.

To be successful, the use of an exothermically oxidizable, e. g., combustible, component in pelletizing demands that the amount of air blown through the furnace be kept within close limits. If the furnace is blown with an amount of air much in excess of the theoretical amount required, the effect of the peak temperatures gained by the use of a combustible ingredient may be largely lost. This comes about because an excess of air sweeping by the pellets will cause such a great amount of heat to be abstracted from them that they do not reach desired temperatures. This effect is particularly serious as it affects the shell of the pellets for they then may have a temperature substantially below that required for proper induration.

The use of a combustible ingredient is particularly desirable in pelletizing ores that contain in themselves no combustible mineral. For example: in pelletizing a hematite ore, it is necessary to heat these pellets to temperatures approaching 2400 degrees F. in order to effect the desired induration. If the necessary heat is to be supplied entirely from the combustion chamber, this means that the gases from the combustion chamber must be at least as hot as 2450 degrees F. This results in an unsatisfactory operating condition in that fusion of fines may occur in the combustion chamber. A more serious effect, however, is the fact that if the heat is supplied by way of the combustion chamber gas only, the shell of the pellets will be considerably hotter than their interiors and fusion of the pellets one to another will occur; at the same time, because of the poor transfer of heat, the cores of the pellets may not reach an induration temperature and may be quite soft. In the case of indurating pellets of initially moist finely divided magnetite concentrates, the pellets are made to contain a carbonaceous fuel in an amount corresponding to from about 2 to about 30 pounds of contained carbon per long ton, dry weight, of the magnetite concentrates.

The invention will now be described in greater detail in the following specific examples and with reference to the accompanying drawing, the single figure of which includes a graph illustrative of the thermal histories of the solids and the gases in their passage through the furnace.

*Example 1*

The process can be best explained by citing a specific example. A magnetite concentrate made from a Minnesota taconite was used as the starting material. This concentrate contained 64.53% iron and 7.26% silica on a dry basis. In size, the product had the following screen analysis:

| Mesh: | Per cent, weight |
|---|---|
| +100 | 0.42 |
| +150 | 3.56 |
| +200 | 11.56 |
| +325 | 16.28 |
| −325 | 68.18 |
| Total | 100.00 |

To the filtered concentrate containing 9.54% moisture was added the equivalent of 4 lbs. of starch per long ton of dry concentrates to give wet and dry strength and 13.1 lbs. of ground anthracite to give the equivalent of 10 lbs. of carbon per long ton of feed. The purpose of the anthracite was to furnish an oxidizable component that produces a peak temperature in excess of the combustion chamber temperature. The iron concentrate and the additives were then mixed, and the homogeneous mixture was fed to a balling drum where balls having a size in the range of ⅝" to 1½" were produced. These balls were fed to a shaft type furnace, having an inner top diameter of 30 inches, at the rate of 1800 lbs. per hour on a dry basis. The combustion chamber temperatures were held at 1800° F. The exit gases from the top of the furnace during the test period averaged 230° F. The temperature of the discharged pellets was 350° F. After the furnace had reached a balance, the amount of oil burned was 1.41 gallons per hour or 1.76 gallons per long ton of pellets produced. Air initially substantially unheated, was blown into the bottom of the furnace at the rate of 390 C. F. M. measured under standard conditions. In this test, detailed measurements were made of the temperature of the pellets and of the gas temperatures throughout the vertical height of the furnace. Pellet temperatures were measured by embedding thermocouple wires in green balls. The gas temperatures were measured in the same manner except that the thermocouples were not imbedded in the balls. These temperatures were also checked by conventional thermocouples inserted through the furnace walls.

The results of these measurements are shown in graphical form in the drawing. For convenience, a cross-section of the furnace is plotted on exactly the same scale so that the reader may readily see what the gas and pellet temperatures were for any part of the furnace. In the drawing, the solid line graph "$a$" and the broken line graph "$b$" represent the temperatures of the solids (i. e., pellets) and of the gases, respectively, encountered in carrying out the procedure of the present specific example. The dot-and-dash line graph "$c$" and the dotted line graph "$d$" represent the temperatures of the solids and of the gases, respectively, encountered in effecting induration of hematite ore fines pellets not containing an exothermically oxidizable component. An inspection of graphs "$a$" and "$b$" of the drawing shows the novelty of the process in that in only the upper 10 inches of the furnace did the temperature of the so-called "heating gas" (graph "$b$") exceed the temperature of the pellets (graph "$a$"). An inspection of the graphs shows that a peak temperature of 2360° F. was reached in the cores of the pellets and that said temperature was substantially maintained in a zone from 12 to 24 inches down from the stockline. The temperature of the gases from the combustion chamber was 1800° F.; accordingly, the rise of 560° F. in pellet temperature was due entirely to the heat of oxidation of the exothermically oxidizable material present in the pellets—in this example, magnetite and anthracite coal. The temperature of 2360° F. is essentially the fusion temperature of the ore mixture, and this resulted in giving pellets having a hard, dense, semi-fused core. The gas temperatures in this same zone were from 80° to 100° F. lower than the pellet core temperatures, and this temperature was high enough for the pellet shell to approach incipient fusion and so give a hard shell; but, since the gas and shell temperatures were definitely below the fusion temperatures, there was no tendency for the pellets to fuse and stick together. The pellets from this furnace were of good quality and were entirely suitable for all purposes.

To attain equal induration of iron ore pellets not containing an exothermically oxidizable component, e. g., pellets of hematite ore, it is necessary to maintain a combustion chamber temperature of 2450° F. in order to raise the temperature of the pellets to 2360° F. The top temperature found in the shaft furnace occurs at a level opposite the upper ports of the combustion chambers, and the temperatures of the gas and of the pellets in the upper chamber both decrease from the upper ports to the stockline of the column. The temperatures of the gas current in the upper or indurating chamber are approximately 100° higher than the pellets' temperatures at equal levels.

In the absence of an exothermically oxidizable component in the pellets, the set of conditions pictured in graphs "c" and "d" results in a very unsatisfactory furnace operation. The gases issuing from the combustion chambers must be maintained at a temperature above the incipient fusion temperature of the ore, with resulting slagging difficulties. As the gases in the upper chamber are, at the point of entrance from the combustion chambers, above the incipient fusion temperature, there will be a tendency for the exteriors of the pellets to be semi-molten and all pellets will tend to chunk up. At the same time, because the exteriors of the pellets are the hottest, there will be a tendency for the interiors of the pellets to be soft. Another disadvantage is that the maximum temperature occurs at a level a number of feet down from the top of the furnace, and the weight of the material superimposed at the level of greatest temperature will also tend to fuse the pellets together into a mass. With use of an exothermically oxidizable component, peak temperatures come at a point high up in the furnace where there is little loading on each individual pellet. The exteriors of the pellets are maintained below the fusion temperature by being bathed with the relatively cooler "heating gas," so little or no fusion between pellets occurs.

*Example 2*

A flotation hematite concentrate containing 58.26% iron and 8.34% silica was the starting material. The concentrate was made by treating Mesabi washing plant tailings and recovering the iron mineral which was predominantly hematite but did contain a minor amount of limonite. In size this concentrate was essentially all finer than 100 mesh and contained 61% of material finer than 325 mesh. The filtered concentrate contained 8.45% moisture. To this concentrate was added 8 lbs. of bentonite to give plasticity and strength to the pellets. Because this concentrate contained no oxidizable mineral such as magnetite, it was necessary to secure the desirable peak temperature by coal additions alone, and the coal additions were, therefore, considerably increased over the amounts used in Example 1. Carbon was added, in the form of anthracite culm, to the amount of 28–30 lbs. per long ton of concentrate on a dry basis.

The material was balled and furnaced in the same apparatus described in Example 1. The feed rate was 1500 lbs. per hour (dry basis) or .67 long ton per hour. The combustion chamber temperatures were maintained at 1875° F. and air, initially substantially unheated, was blown up through the furnace at the rate of 290 C. F. M. The average temperature of the top gas was 315° F. and the temperature of the discharged pellets was 290° F. The oil consumption was 1.31 gallons per hour or 1.95 gallons per long ton of fired pellets.

The peak temperature that the pellets reached in the furnace was found to be 2435° F. and the maximum gas temperature was measured and found to be 2350° F.

The pellets from this test had a semi-fused center and a shell that was well indurated but had not reached that state of fusion where pellets would adhere one to another.

The solids and gas graphs applicable to this example were substantially the same as graphs "a" and "b" of the drawing.

We claim:

1. Process of agglomerating particles of finely divided ore, which comprises homogeneously dispersing an amount of a finely divided solid carbonaceous fuel through a moist mass of the ore particles, forming the resulting moist mixture into pellets, the amount of solid carbonaceous fuel homogeneously dispersed therethrough being at least equal to 2 but not materially in excess of 30 pounds of contained carbon per long ton, dry weight, of the ore particles but insufficient per se to yield by its oxidation the heat necessary to raise the pellets to fusion temperature, continuously passing the pellets as a column downwardly through a shaft-type furnace chamber, continuously heating a stream of combustion-supporting oxidizing gas in a space outside of said furnace chamber to a temperature at least as high as 1800° F. but substantially below the fusion temperature of the ore particles and thereupon immediately introducing the heated stream of oxidizing gas into said column at a level intermediate its bottom and its top and passing the same countercurrently through the remainder of the column of pellets, and so regulating the initial temperature and volume of said introduced stream of heated oxidizing gas that the heat content thereof when supplemented only by the heat of oxidation of exothermically oxidizable components of the pellets is sufficient to cause the interiors of the pellets to attain at least partial fusion while preventing any substantial fusion of their exteriors.

2. The invention defined in claim 1, in which the ore particles are oxidic iron ore concentrates.

3. The invention defined in claim 1, in which said stream of combustion-supporting oxidizing gas comprises a stream of air which has been passed, initially, at substantially atmospheric temperature, countercurrently through the lower portion of said column of pellets and thereupon diverted from said column of pellets to said heating space.

4. The process defined in claim 1, in which the interiors of the pellets attain a peak temperature at least of the order of 2350° F.

References Cited in the file of this patent

UNITED STATES PATENTS

| | | |
|---|---|---|
| Re. 19,757 | Royster | Nov. 12, 1935 |
| 1,447,071 | Giesecke | Feb. 27, 1923 |
| 1,508,101 | Holmberg | Sept. 9, 1924 |
| 2,279,033 | Dolbear | Apr. 7, 1942 |
| 2,356,024 | Andersen et al. | Aug. 15, 1944 |
| 2,357,198 | Hooey | Aug. 29, 1944 |
| 2,506,618 | Sainderichin | May 9, 1950 |
| 2,533,142 | Royster | Dec. 5, 1950 |
| 2,624,560 | Craig et al. | Jan. 6, 1953 |
| 2,696,432 | Davis | Dec. 7, 1954 |

FOREIGN PATENTS

| | | |
|---|---|---|
| 193,012 | Great Britain | Sept. 20, 1923 |